B. F. Randell
Reciprocating Winnower
Nº 87,706. Patented Mar. 9, 1869.

Witnesses.
Harry King
Leopold Overt

Inventor.
B. F. Randell
per Alexander & Mason
Attys.

UNITED STATES PATENT OFFICE.

B. F. RANDELL, OF DES MOINES, IOWA.

IMPROVEMENT IN FANNING-MILLS.

Specification forming part of Letters Patent No. 87,706, dated March 9, 1869.

*To all whom it may concern:*

Be it known that I, B. F. RANDELL, of Des Moines, in the county of Polk, and in the State of Iowa, have invented a new and useful Improvement in Fanning-Mills; and do hereby declare that the following is a full, clear, and exact description thereof, reference being had to the accompanying drawings, and to the letters of reference marked thereon.

The nature of my invention consists in an improvement upon the adjustment of screens in a machine for cleaning and separating grain, by placing a movable or slide screen in the frame below the gang of riddles, so that it may be drawn up or pushed down, leaving a cut-off or aperture at the upper end of said slide or movable screen, large or small, at the option of the operator.

In order to enable others skilled in the art to which my invention appertains to make and use the same, I will now proceed to describe its construction and operation, referring to the annexed drawings, which form a part of this specification, and in which—

Figure 1:
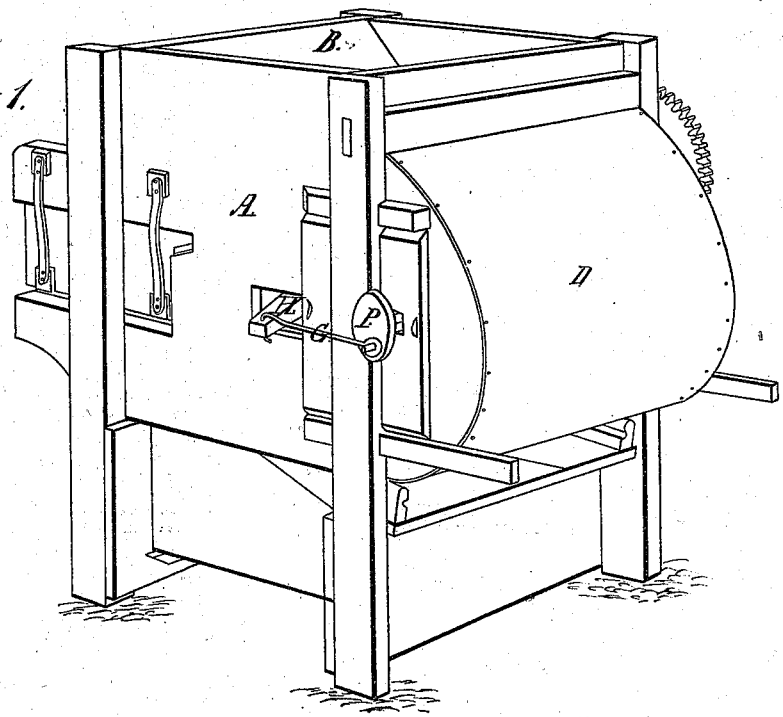
Figure 2:
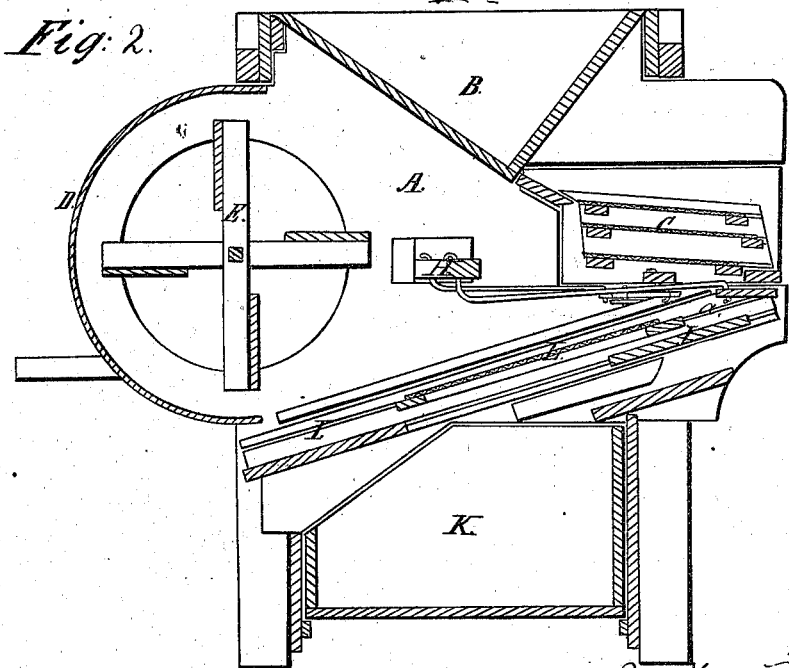

Figure 1 is a perspective, and Fig. 2 a side elevation in section.

A represents the frame of a fanning-mill. B is the hopper through which the grain is poured onto the gang of riddles C. D represents the drum, which contains the fan E. From a pulley, F, on the end of the fan-shaft, a rod or pitman, G, connects with a lever, H, giving said lever a backward and forward motion. Another rod, which connects the lever G with the gang of riddles, gives them a reciprocating side motion.

Under the gang of riddles C is placed a frame, I, inclined toward the rear of the machine, which frame, being also connected by a rod with the lever G, obtains an up-and-down motion—the sides of the frame I are grooved, and in these grooves is placed a movable or slide screen, L, which can be moved up or down in said grooves, making the cut-off or aperture $a$ at the front end larger or smaller, as may be desired—this cut-off or aperture being made larger when cleaning wheat for seed than when cleaning merchantable wheat.

There is also a second screen or board, J, immediately under the aperture or cut-off, $a$, so made, which screen or board is also placed in grooves on the sides of the frame I. The board J catches and conveys the wheat that falls through the aperture $a$ into a box, K, under the mill. This wheat so caught and conveyed will be suitable for merchantable wheat when the mill is used to clean seed-wheat, and at the same time the seed-wheat is conveyed by the slide-screen L above mentioned down to the end of the mill. This seed, by such adjustment, will be pure, separated from oats, fennel-seeds, and imperfect grains.

When the mill is used to clean for market, the aperture or opening $a$ is made much smaller by the operator, so as only to cut off two or three quarts to the bushel, which two or three quarts can be taken up and run over again.

The principle is this: So far, or nearly so, as the gang of riddles above the slide or movable screen is kept full of wheat the oats are carried by the motion of the gang down upon the wheat toward the end of the gang whence the chaff issues, so that the oats do not begin to fall or sift through till near said end, when the wheat is very light upon the gang, and permits the oats to sift through, which leaves a pure stream of wheat falling for near two-thirds of the length of the gang of riddles. Meanwhile the wind from the fans blows all foul seed, &c., equally as far forward.

Hence, in running for seed-wheat, by drawing up the slide or movable screen L just far enough, the pure stream of wheat mentioned is caught and conveyed down to the end of the mill by itself in a pure state, while the balance falls through the aperture or cut-off $a$, and is caught and carried by the aforementioned board or under screen J into the said box K, under the mill, and is clean enough for merchantable purposes.

By drawing up the slide-screen L so as to leave no cut-off or aperture, the machine operates as other mills.

By the adjustment and cut-off above described the gang of riddles can be used with less inclination or deflection toward the end where the chaff issues than is requisite in other mills, and thereby prevents the running over of wheat with oats and chaff to the extent that is requisite or is the case in other mills.

The gang of riddles, C, which I use is also different from any heretofore used. In other machines each separate screen or riddle is inserted in grooves in the frame, which, when they are to be cleaned, necessitates a great deal of trouble. I connect all the screens together, and insert them in the frame at one time. Thus, when they are to be cleaned, they can all be cleaned at one time instead of each separately.

Having thus fully described my invention, what I claim as new, and desire to secure by Letters Patent, is—

Providing a fanning-mill with a movable or sliding screen under the gang of riddles, whereby an optional cut-off is obtained, for the purpose of separating seed-wheat from merchantable wheat, substantially as herein set forth.

In testimony that I claim the foregoing I have hereunto set my hand this 16th day of October, 1868.

B. F. RANDELL.

Witnesses:
  LEOPOLD EVERT,
  A. N. MARR.